Patented Oct. 20, 1942

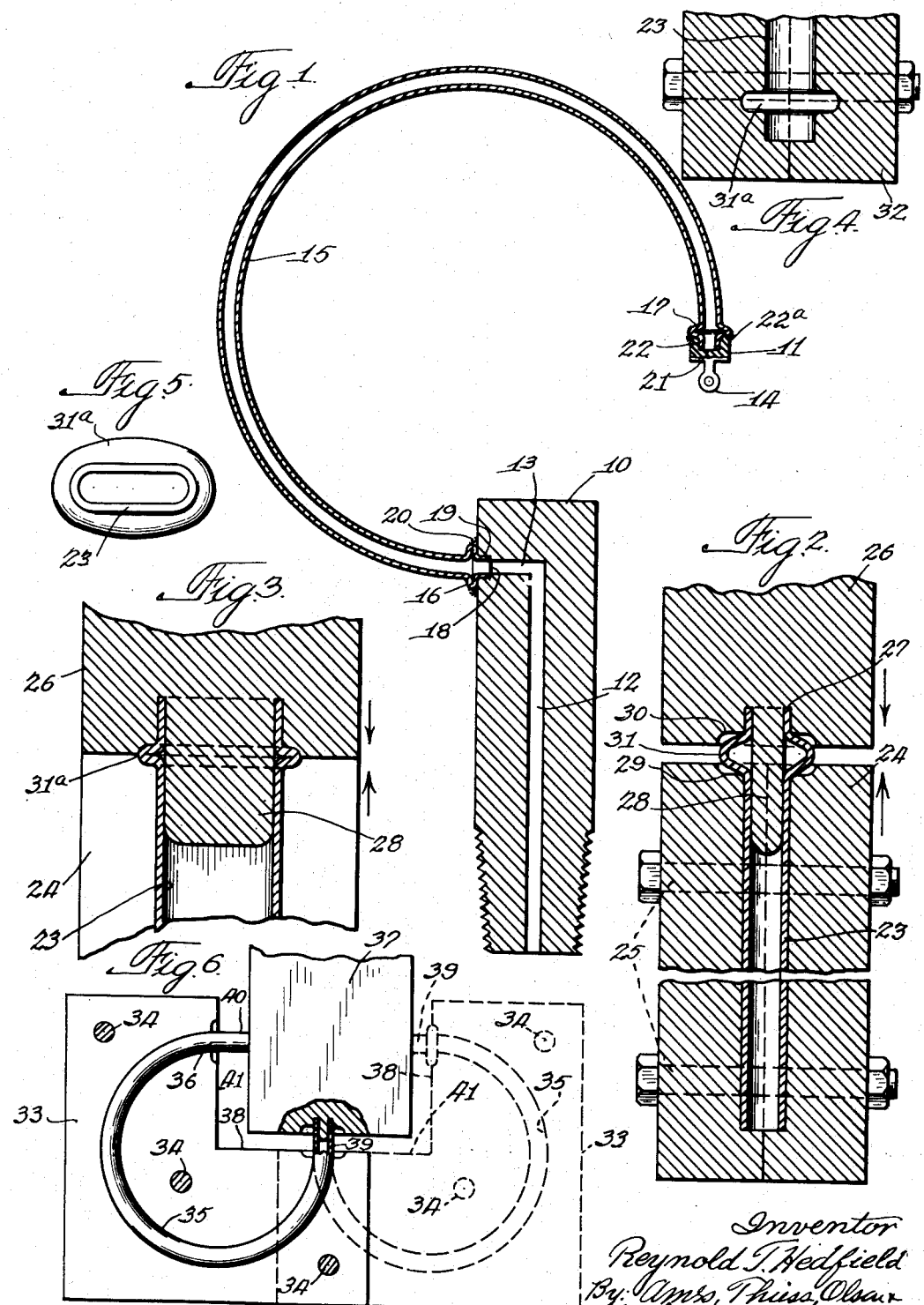

2,299,542

UNITED STATES PATENT OFFICE 2,299,542

PRESSURE GAUGE

Reynold T. Hedfield, Chicago, Ill., assignor to Jas. P. Marsh Corporation, Chicago, Ill., a corporation of Illinois Application January 10, 1940, Serial No. 313,171

2 Claims. (Cl. 73—109)

My invention relates to gauges, more particularly to pressure gauges of the Bourdon tube type, and has for an object the provision of an improved method of manufacture and an improved device of this character.

Heretofore, Bourdon tubes for various types of gauges, and particularly for high pressure gauges, have been formed by boring a solid bar of metal to a point adjacent one end so as to leave that end closed by an integral body of metal, or by welding the opposite ends of a suitable, drawn metal tube to the respective gauge elements commonly known as "sockets" and "end pieces." The above-mentioned boring operation is relatively slow and expensive and difficulties are often encountered in providing satisfactory welds of drawn metal tubing due to the fact that the heat required to form the weld or similar fused joint may cause damage to the thin walls of the drawn tube. Such tubes are of necessity formed of tempered spring metal such as steel, brass, bronze, etc., and if excessively heated will lose the temper initially imparted thereto.

Something is yet to be desired therefore in Bourdon tube gauges wherein the ends of the tube must be tightly and permanently sealed against leakage, and it is accordingly a further object of my invention to provide an improved method of manufacture for Bourdon tubes of this character and to provide Bourdon tubes which may be readily and permanently secured to suitable gauge elements by fusible joints, such as a weld or the like, without damage to the tube itself.

In carrying out my invention in one form, I provide a Bourdon tube comprising a tubular member having thin walls formed of tempered spring metal, which walls are shaped adjacent the opposite ends thereof to provide double-thickness, integrally formed flanges spaced inwardly from the ends of the tubular member, and the gauge elements are provided with apertures or sockets for receiving the ends of the tubular member so that the flanges abut the portions of the gauge elements surrounding the sockets. The flanges thus position the tubular member in the sockets and the outer edges of the flanges provide welding surfaces to which heat may be applied, in the formation of fusible joints between the tubular member and the gauge elements, without overheating the thin walls of the tubular member.

In order to form the flanges on the tubular members, the member is peripherally supported throughout substantially the entire length thereof except at a predetermined portion adjacent one end, and an endwise force is applied to the member of sufficient magnitude to cause the unsupported portion of the walls of the member to bow outwardly and form a peripheral bead. Completion of the flange is then accomplished by axially flattening the bead while maintaining the endwise force on the member so as to form a double-thickness flange integral with the walls.

For a more complete understanding of my invention reference should now be had to the drawing, in which Fig. 1 is a sectional elevational view of a Bourdon tube gauge embodying my invention, only so much of the gauge being shown as is necessary properly to illustrate the invention;

Fig. 2 is a fragmentary somewhat diagrammatic view in section of one form of apparatus which may be used in carrying out my invention, the apparatus being shown in an intermediate position during the formation of a Bourdon tube such as is illustrated in Fig. 1;

Fig. 3 is a fragmentary sectional view taken at right angles to Fig. 2 and illustrating the final position of the apparatus during the forming operation;

Fig. 4 is a fragmentary sectional view of a die member adapted for use in forming the opposite end of a tubular member after one end has been formed in the apparatus of Figs. 2 and 3;

Fig. 5 is an end view of a Bourdon tube embodying my invention; and

Fig. 6 is a fragmentary elevational view partly in section of another form of apparatus for practicing my invention, a portion of one die member being removed more clearly to illustrate the method involved.

Referring now to Fig. 1 of the drawing, I have shown my invention as embodied in a gauge comprising a pair of relatively movable gauge elements 10 and 11, the element 10 constituting the usual post or socket provided with an axial passageway 12 and an intersecting passageway 13 for connecting the interior of a Bourdon tube to a source of pressure. The element 11, as shown, constitutes an end piece having a portion 14 adapted to be connected to the usual indicating mechanism (not shown) of the gauge. Extending between the gauge elements 10 and 11, I provide a Bourdon tube or spring 15 embodying my invention and comprising a thin-walled tubular member of spring metal such as steel, brass, bronze or the like, which is provided adjacent its opposite ends with outwardly extending double-thickness flanges 16 and 17.

As shown, the gauge element 10 is provided with a socket 18, in which the passageway 13 terminates, and which receives the end portion 19 of the tubular member 15 so that the flange 16 abuts the adjacent wall of the element 10. The flange 16 thus provides a welding portion of double thickness, and the outer edges of the flange 16 may be secured to the element 10, as shown, by a suitable welded, soldered or similar fusible joint 20 without subjecting the relatively thin walls of the tube 15 to excessive heating. It will thus be apparent that Bourdon tubes embodying my invention may be securely and permanently sealed to suitable gauge elements without danger of burning the tube or destroying the original temper of the tube.

Similarly, the end piece 11 includes a socket 21 for receiving the opposite end portion 22 of the tube 15 so that the flange 17 abuts the end piece 11, the outer edges of the flange 17 being secured to the end piece 11 by a suitable fusible joint 22a which may be formed without burning or otherwise injuring the thin walls of the Bourdon tube.

In forming double-thickness flanges on a Bourdon tube, such as the flanges 16 and 17 on the Bourdon tube 15, in accordance with one embodiment of my invention a straight tubular member 23 (Fig. 2), which is formed of tempered spring metal and which is preferably of flattened oval shape in cross section as shown best in Fig. 5, is placed in a correspondingly-shaped cavity in a die member 24 so that the tubular member 23 is supported throughout its entire length except at the portion which projects above the upper end of the die member 24. Preferably the die member 24 is composed of two similar portions adapted to be clamped together by suitable bolts 25 so as firmly to hold the tubular member 23. Associated with the die member 24 is a second die member 26 which is provided with a socket 27 adapted to receive the extending end of the tubular member 23 and with a mandrel 28 adapted to extend into the tubular member 23. As shown, the die members 24 and 26 are respectively provided with recesses 29 and 30 in the cooperating faces to receive the flange to be formed on the member 23.

When the die members 24 and 26 are forcibly moved toward each other, as indicated by the arrows in Fig. 2, an endwise force is exerted on the tubular member 23 of sufficient magnitude to cause the unsupported portion of the thin walls of the member to bow outwardly and form a peripheral bead 31. Continued movement of the die members, from the position shown in Fig. 2 to the position shown in Fig. 3, maintains the endwise force on the tube and causes the opposite faces of the bead 31 to be engaged by the walls of the recesses 29 and 30, so that the bead 31 is axially flattened and forms a double-thickness flange (31a in Fig. 3) extending outwardly from the tubular member and comprising reversely bent portions of the walls of the tubular member.

Upon completion of the forming operation above described, the tubular member 23 is removed from the die member 24 and after being turned end for end is placed in a die member 32 (Fig. 4) which is formed at its lower end to receive the flange 31a. The opposite end of the tubular member 23, which of course extends from the upper end of the die member 32, is then engaged by the die member 26 to form a corresponding flange as described above in connection with Figs. 2 and 3. Subsequent to the formation of the double-thickness integral flanges thereon, the tubular member may be shaped to provide a curved Bourdon tube such as the tube 15 of Fig. 1. Although this shaping operation may be carried out in any desired manner, it is preferably accomplished by filling the tubular member with a low melting point alloy prior to the rolling or shaping operation, and removing the alloy by melting the same after the proper curvature has been imparted to the tubular member.

In some cases it may be desirable to shape the tubular member to the desired curvature prior to forming the double-thickness integral flanges thereon, and in accordance with a further embodiment of my invention the apparatus illustrated in Fig. 6 may be employed. Referring to Fig. 6, I provide a split die member 33 comprising a pair of complementary portions adapted to be secured together by suitable bolts 34, the front one of the complementary portions being omitted in Fig. 6 more clearly to illustrated the construction. As shown, the die member 33 is substantially L-shaped and is provided with a groove 35 for receiving a curved tubular member 36 the opposite ends of which extend outwardly from the die member, as shown.

In order properly to form double-thickness integral flanges adjacent the opposite ends of the tubular member 36, the die member 33 and the tubular member 36 are initially arranged in the position shown in heavy lines in Fig. 6 and a cooperating die member 37 is moved toward the face 38 of the die member 33 so as to engage the extending end 39 of the tubular member 36 and exert an endwise force of sufficient magnitude to form a flange in the manner heretofore described, the unsupported portion adjacent the end 39 being first bowed outwardly and then flattened axially to form the flange.

Movement of the tubular member 36 in the groove 35 during the flange-forming operation is prevented by the clamping action of the die member 33 on the tubular member, the bolts 34 being preferably tightened sufficiently so as to cause frictional gripping of the tubular member. In order further to insure that the tubular member 36 does not move longitudinally, however, the cooperating die member 37 is preferably arranged so that the left-hand surface thereof engages the opposite end 40 of the tubular member, as shown in Fig. 6.

Formation of a similar flange on the end 40 of the tubular member 36 may now be accomplished by moving the die member 33 to the position indicated in broken lines in Fig. 6, so that the uniformed end 40 is positioned below the cooperating die member 37 and so that the flanged end 39 engages the right-hand face of the cooperating die member. It will of course be apparent that, upon movement of the die member 37 toward the face 41 of the die member 33, the extending end 40 of the tubular member 36 will be engaged and formed to provide a double-thickness flange in the manner heretofore described.

It will now be apparent that gauges embodying my invention comprise Bourdon tubes that may be quickly and easily assembled and permanently secured to the cooperating gauge elements by an autogenous weld or similar fusible joint without danger of injury to the thin walls of the Bourdon tube, the welding flame or other source of heat being confined to the outer edges of the double-thickness flanges, and it will likewise be apparent that Bourdon tubes embodying the present invention, and provided with double-thickness flanges adjacent the ends thereof, may be formed in accordance with the invention in a simple and economical fashion from thin-walled tubular members of tempered spring metal.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A Bourdon tube for pressure gauges and the like comprising a tubular member having thin walls formed of tempered spring metal and having portions of said walls inwardly from but adjacent one end of said tubular member outwardly and reversely bent with said bent portions contacting each other in face-to-face relation to form a peripherally extending axially flattened bead member having a resulting thickness equal to about twice the thickness of said walls.

2. In a pressure gauge or the like, a Bourdon tube comprising a tubular member having thin walls formed of tempered spring metal, said tubular member having peripherally extending, axially flattened bead members thereon spaced inwardly from but respectively adjacent to the opposite ends of said tubular member, said bead members being formed by portions of said walls outwardly and reversely bent into face-to-face engagement with each other and having a resulting thickness equal to about twice the thickness of said walls; a pair of relatively movable gauge elements having sockets for respectively receiving said opposite ends of said tubular member, said bead members abutting the portions of said elements surrounding said sockets to position said ends in said sockets; and fused metal joints uniting the outer edges of said bead members to said elements, whereby a unitary structure is provided without subjecting said tempered thin walls to excessive heat during formation of said joints.

REYNOLD T. HEDFIELD.